United States Patent
Bayesteh et al.

(10) Patent No.: US 9,641,303 B2
(45) Date of Patent: May 2, 2017

(54) SYSTEM AND METHOD FOR INCREASING LOW DENSITY SIGNATURE SPACE

(71) Applicant: Huawei Technologies Co., Ltd., Shenzhen (CN)

(72) Inventors: Alireza Bayesteh, Ottawa (CA); Jianglei Ma, Ottawa (CA); Hosein Nikopour, Ottawa (CA); Zhihang Yi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 506 days.

(21) Appl. No.: 14/021,907

(22) Filed: Sep. 9, 2013

(65) Prior Publication Data
US 2015/0071182 A1      Mar. 12, 2015

(51) Int. Cl.
*H03K 9/00* (2006.01)
*H04L 27/00* (2006.01)
(Continued)

(52) U.S. Cl.
CPC .......... *H04L 5/0051* (2013.01); *H04L 5/0042* (2013.01); *H04W 72/0413* (2013.01); *H04W 72/00* (2013.01); *H04W 72/0446* (2013.01)

(58) Field of Classification Search
USPC .......... 375/211, 219, 220, 222, 240, 240.26, 375/259, 285, 284, 260, 278, 295, 299,
(Continued)

(56) References Cited

U.S. PATENT DOCUMENTS

| 6,990,137 B2 | 1/2006 | Smee et al. |
| 2008/0155169 A1* | 6/2008 | Hiltgen ................. G06F 9/5077 711/6 |

(Continued)

FOREIGN PATENT DOCUMENTS

| GB | 2495709 A | 4/2013 |
| WO | 9960729 A1 | 11/1999 |

(Continued)

OTHER PUBLICATIONS

International Search Report and Written Opinion received in International Application No. PCT/CN2014/085813 mailed Dec. 2, 2014, 12 pages.

(Continued)

*Primary Examiner* — Linda Wong
(74) *Attorney, Agent, or Firm* — Slater Matsil, LLP

(57) ABSTRACT

Embodiments are provided herein for increasing low density signature space for multiplexed transmissions for a plurality of users. The embodiments include generating a virtual signature using a combination operation on a plurality of basic signatures. The generated virtual signatures are provisioned as basic resource units (BRUs) for transmissions for corresponding users. The combination operation is a row-wise or column-wise permutation for combining, in each of the virtual signatures, rows or columns of corresponding basic signatures. The rows or columns represent sequences of frequency bands at one time interval or sequences of allocated time intervals at one frequency band. Alternatively, the combination operation is intra-basic resource unit (BRU) hopping. The embodiments also include generating a plurality of BRU sets comprised of virtual signatures. Each of the BRU sets is provisioned for a corresponding user.

20 Claims, 7 Drawing Sheets

(51) Int. Cl.
*H03D 1/04* (2006.01)
*H04L 27/06* (2006.01)
*H04L 5/00* (2006.01)
*H04W 72/04* (2009.01)
*H04W 72/00* (2009.01)

(58) Field of Classification Search
USPC .......................................... 375/316, 304, 239
See application file for complete search history.

(56) References Cited

U.S. PATENT DOCUMENTS

| | | | | |
|---|---|---|---|---|
| 2009/0067553 A1* | 3/2009 | McElwain | ........ | H03M 13/2957 375/341 |
| 2009/0252240 A1* | 10/2009 | Kwon | ................. | H04B 7/0639 375/260 |
| 2010/0020757 A1* | 1/2010 | Walton | ...................... | H04L 1/06 370/329 |
| 2010/0172430 A1* | 7/2010 | Melzer | ................. | H04B 7/0417 375/267 |
| 2011/0085620 A1* | 4/2011 | Measson | ............... | H04L 1/0075 375/299 |
| 2011/0261257 A1* | 10/2011 | Terry | ................. | G06K 9/00221 348/515 |
| 2011/0293028 A1* | 12/2011 | Panicker | .............. | H04J 11/0036 375/260 |
| 2012/0219042 A1* | 8/2012 | Onggosanusi | ....... | H04B 7/0456 375/219 |
| 2012/0317566 A1* | 12/2012 | Santos | ................ | G06F 9/45558 718/1 |
| 2013/0148755 A1* | 6/2013 | Melzer | ................. | H04B 7/0417 375/267 |
| 2013/0170437 A1* | 7/2013 | Onggosanusi | ......... | H04B 7/024 370/328 |
| 2014/0369434 A1* | 12/2014 | Taherzadehboroujeni | | H04B 7/0456 375/261 |
| 2015/0071182 A1* | 3/2015 | Bayesteh | .............. | H04L 5/0042 370/329 |

FOREIGN PATENT DOCUMENTS

| | | |
|---|---|---|
| WO | 2010102435 A1 | 9/2010 |
| WO | 2013044970 A1 | 4/2013 |
| WO | 2015000511 A1 | 1/2015 |

OTHER PUBLICATIONS

Choi, J. "Low Density Spreading for Multicarrier Systems," Spread Spectrum Techniques and Applications, IEEE Eight International Symposium, Aug. 30-Sep. 2004, pp. 1-4, Sydney, Australia.

Hoshyar, R. et al.: "Novel Low-Density Signature for Synchronous CDMA Systems Over AWGN Channel," IEEE Transactions on Signal processing, Apr. 2008, pp. 1-11, vol. 56, No. 4.

* cited by examiner

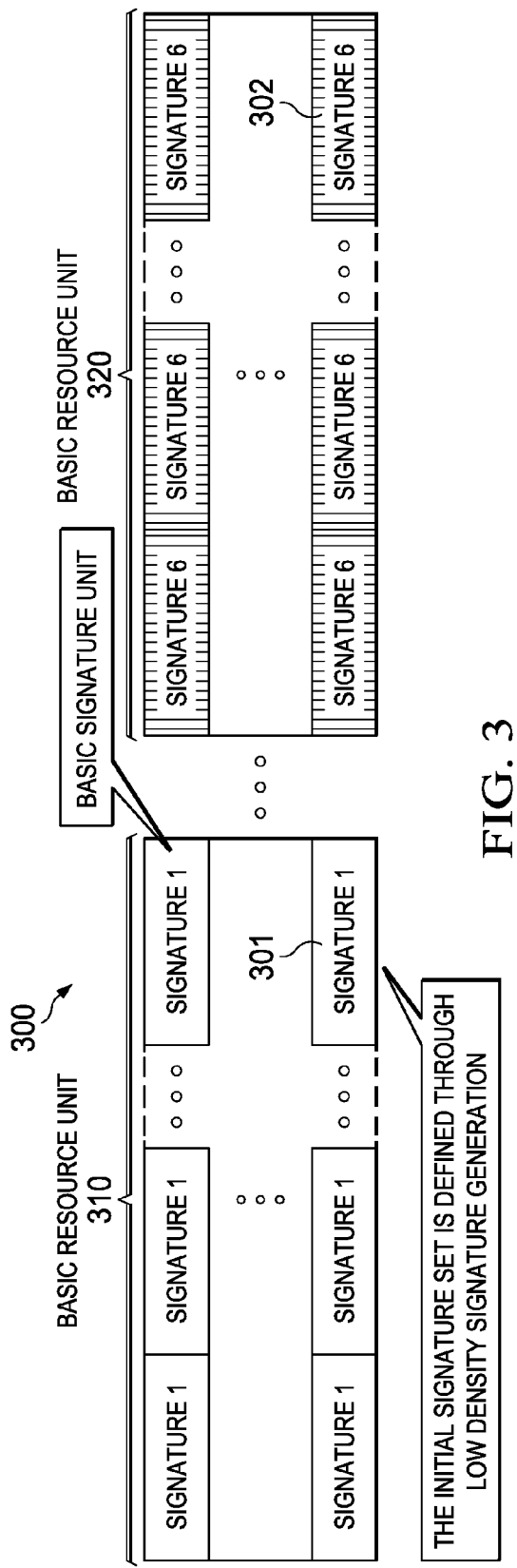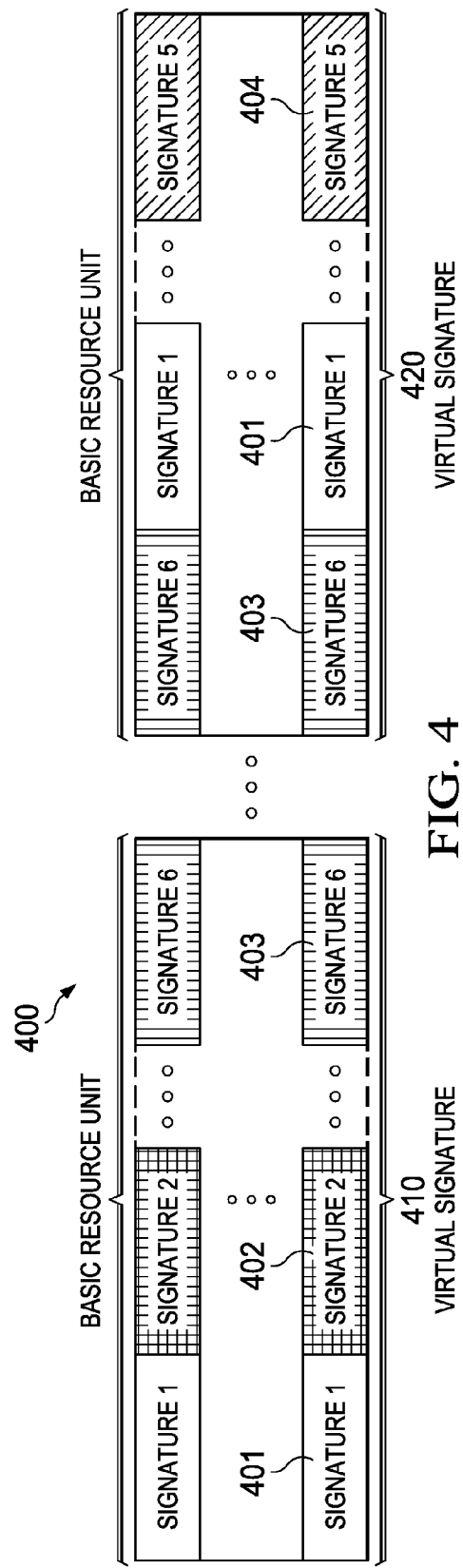

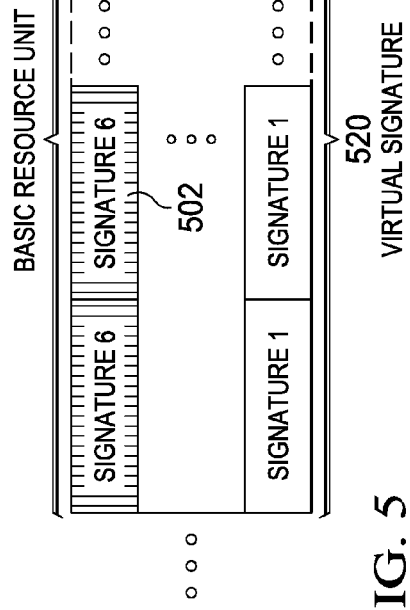
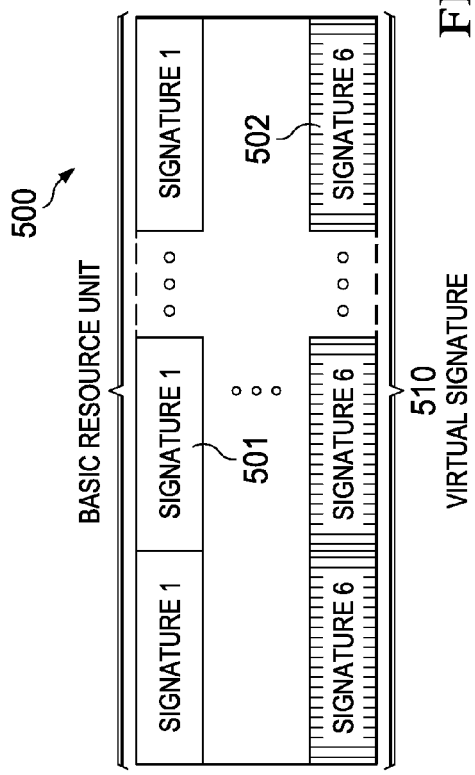
FIG. 5
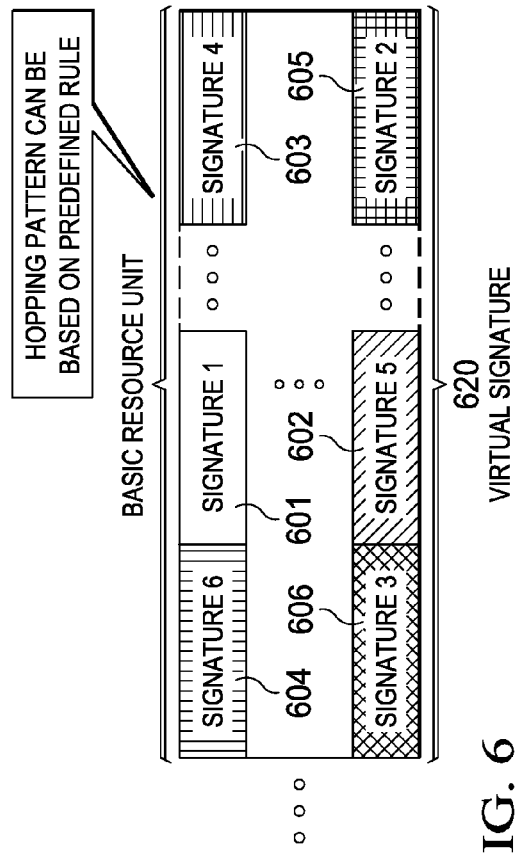
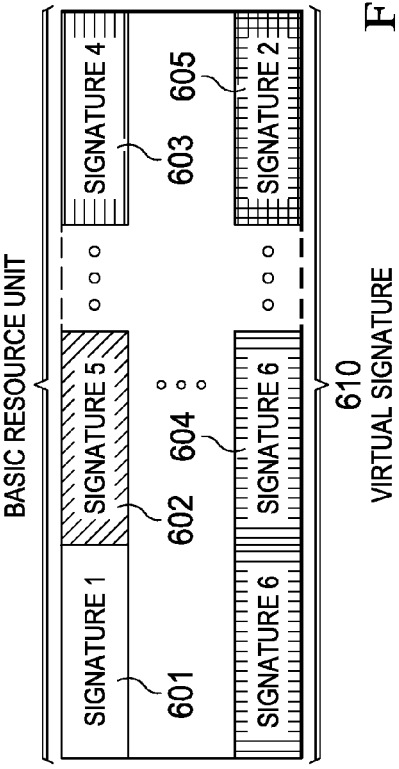
FIG. 6

SYSTEM AND METHOD FOR INCREASING LOW DENSITY SIGNATURE SPACE

TECHNICAL FIELD

The present invention relates to the field of wireless communications, and, in particular embodiments, to a system and method for increasing low density signature space.

BACKGROUND

Code-domain multiplexing over multicarrier modulation is an efficient multiple-access scheme, such as in multi-carrier-code division multiple access (MC-CDMA), low density signature-orthogonal frequency-division multiplexing (LDS-OFDM), and sparse-code-multiple access-orthogonal frequency-division multiplexing (SCMA-OFDM) systems. A potential application of SCMA-OFDM is grant-less transmission with no or low signaling and control overhead for small packet transmission. A challenge for the uplink (UL) in the grant-less transmission is that a receiver of the UL may have no knowledge of which users and how many of them want to access the network. In this case, there is a possibility of collision between signatures (for users), which results in performance degradation. Another issue is the high complexity of pilot signal detection due to a large number of pilot signals and one-to-many mapping between signatures and pilot signals. There is a need for a mechanism and method for increasing the low density signature space to overcome the issues or challenges above.

SUMMARY OF THE INVENTION

In accordance with an embodiment, a method implemented by a network component for providing increased signature space for multiplexed transmissions for a plurality of users includes obtaining a set of basic signatures and generating a set of virtual signatures using a combination operation on the basic signatures. Each of the virtual signatures comprises a combination of at least some of the basic signatures. Each of the virtual signatures is then provisioned as a basic resource unit (BRU) for a user transmission.

In accordance with another embodiment, a method implemented by a network component for supporting low density signatures for multiplexed transmissions for a plurality of users includes receiving a plurality of BRUs for a plurality of users. The BRUs are comprised of virtual signatures, each virtual signature including a combination of low density signatures. The method further includes decorrelating the virtual signatures to narrow down a list of pilot signals. The total number of configured virtual signatures exceeds a total number of available low density signatures. Channels are then estimated using the list of pilot signals.

In accordance with yet another embodiment, a network component for supporting increased signature space for multiplexed transmissions for a plurality of users includes a processor and a computer readable storage medium storing programming for execution by the processor. The programming includes instructions to receive a plurality of BRUs for a plurality of users. The BRUs are comprised of virtual signatures. Each virtual signature includes a combination of basic signatures. The programming includes further instructions to decorrelate the virtual signatures to narrow a list of pilot signals, wherein a total quantity of configured virtual signatures exceeds a total quantity of available basic signatures. The programming further configures the network component to estimate channels using the list of pilot signals.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 illustrates basic resource units (BRUs) comprising basic signatures;

FIG. 4 illustrates an embodiment of virtual signatures generated by column-wise permutation of basic signatures;

FIG. 5 illustrates an embodiment of virtual signatures generated by row-wise permutation of basic signatures;

FIG. 6 illustrates an embodiment of virtual signatures generated by intra-BRU signature hopping;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Typical approaches for designing low density signatures result in having a limited number of signatures, which increases the possibility of signature collision and results in relatively high complexity pilot signal detection and high receiver complexity. The maximum number of low density signatures (LDS) is based on the length of the signature used, which is referred to as spreading factor, and the collision rate (number of overlaid non-zero components). The lower the collision rate and the shorter the signature length, the lower the receiver complexity. Increasing the number of available LDS signatures in a traditional way requires increasing the spreading factor and/or increasing the overloading factor. Both approaches result in higher receiver complexity.

Embodiments are provided herein for increasing low density signature space for multiplexed transmissions for a plurality of users. The embodiments include using a virtual signature derived or constructed using a plurality of component signatures, referred to herein as basic signatures, according to one or more operation for combining the basic signatures. For instance, the basic signatures are combined using permutation, sequence hopping, or other suitable operations described below, to obtain the virtual signatures. The generation and use of the virtual signature (using the combination of basic signatures) maps a first space of basic signatures into a second larger space of virtual signatures. The resulting increase in the low density signature space resolves the issues of pilot/signature collision (e.g., at a detector for multiplexed transmissions (multiplexed pilots/signatures) for multiple users) and receiver design/implementation complexity. Further, the number of signatures can be increased to achieve a one-to-one mapping between pilot signals (also referred to herein as pilots) and signatures, which reduces the pilot detection complexity, e.g., for UL random access. The pilot detection can be reduced by using a signature decorrelator with a relatively low complexity. In downlink (DL) transmission, the scheme also allows a higher overloading factor and better interference management over multiple transmission points (TPs). This signature space mapping approach can be used in any suitable low density signature based system. For example, low density signatures can be used in some CDMA or OFDM systems.

Figure 1:
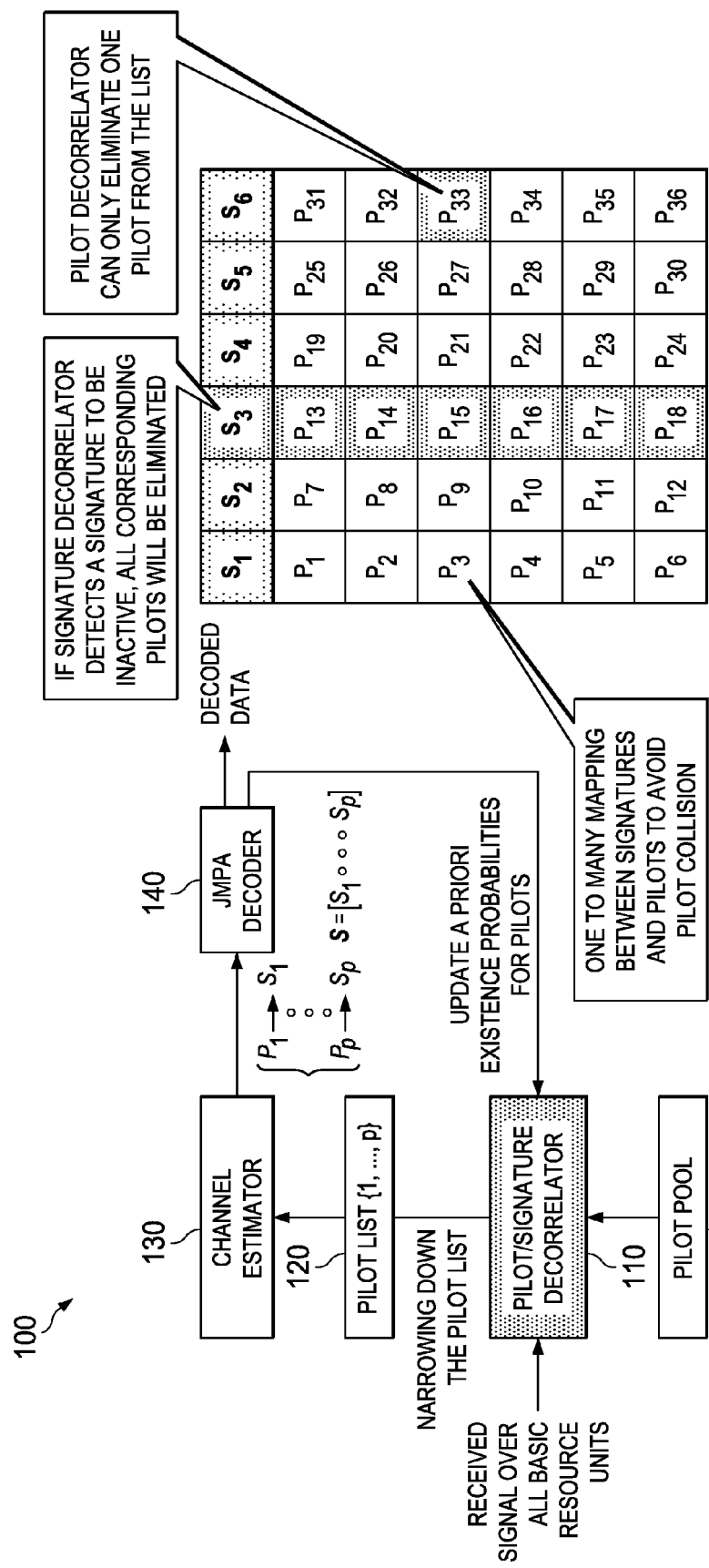
FIG. 1 illustrates an example of a typical receiver for low density signature transmission.

FIG. 1 shows an example of a typical receiver 100 for low density signature transmission. For instance, the receiver 100 can be used at a base station for detecting multiplexed transmissions for a plurality of users. The multiplexed transmissions comprise multiple pilot signals (pilots) belonging to the different users. The pilots may carry information about the signatures that carry the data from the users. The signals from the users are received over basic resource units (BRUs), which are scheduling resource units for transmissions, such as time slots, frequency slots, or both time and frequency slots allocated to users. To decode the received signals in the BRUs, the BRUs are first processed using a combined pilot/signature decorrelator 110 that narrows down the pilot list in the received signals, from a predetermined or known pilot pool 105. A pilot list 120 is then sent to a channel estimator 130 that estimates the channels based on the narrowed down pilot list 120 and provides a list of active signatures to a decoder 140, e.g., a joint signature and data decoder using MPA (JMPA). The decoder 140 decodes the data from the signals. The results are fed back into the decorrelator 110 to update a priori existence probabilities for pilots and signatures. The decorrelation process at the decorrelator 110 comprises signature decorrelation and pilot decorrelation. Due to a limited LDS space, there is a one to many mapping between signatures and pilots (one signature is mapped to many pilots). If a signature is detected to be inactive, all corresponding pilots are eliminated from the list. If a pilot is detected to be inactive, only one pilot is eliminated from the list.

The signatures in the typical receiver 100 can be defined using LDS generation. The length of such signatures, also referred to herein as basic signatures, depends on the spreading factor used. The limited LDS space may cause signature collision, which degrades performance of the JMPA decoder 140. There is a need for a mechanism that allows pilot/signature decorrelator to narrow down the pilot list and make the JMPA decoding process more efficient. Although the receiver 100 narrows down the active pilot list, a pilot detector is still required, leading to high complexity for pilot detection and/or JMPA decoding.

Figure 2:
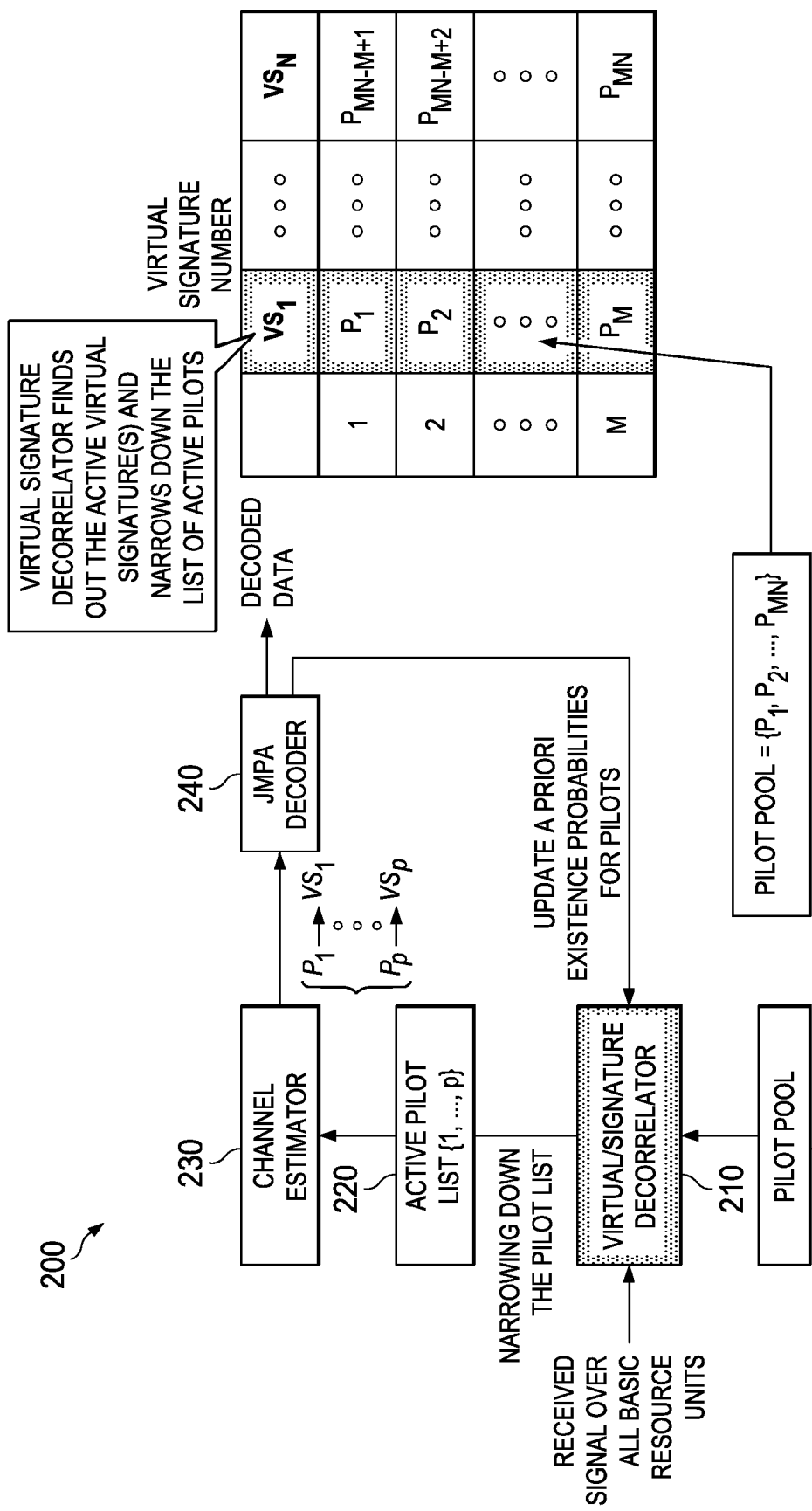
FIG. 2 illustrates an improved receiver using increased low density signature space according to an embodiment of the disclosure.

FIG. 2 shows an improved receiver 200 using increased LDS space according to an embodiment of the disclosure. The receiver 200 resolves the problems due to limited LDS space (signature collision, pilot detection complexity, JMPA decoding complexity) by increasing the LDS space as needed. For this purpose, a virtual signature concept is introduced. The virtual signature is a combination of basic signatures (e.g., the basic signatures used in a typical receiver 100 for multiplexed transmissions for multiple users). The basic signatures provide building components of the virtual signatures. For example, using a basic signature set of 6 basic signatures and defining a virtual signature length of two basic signatures (each virtual signature is a combination of two basic signatures), the number of possible virtual signatures is then equal to $6^2$ or 36 virtual signatures. This means that the LDS space was extended from 6 basic signatures (each having a predefined signature length) into 36 virtual signatures (each having a length of 2 basic signatures).

A virtual signature can be generated by assembling or combining a plurality of basic signatures (e.g., 2 or more basic signatures) according to a predefined operation, for instance using permutation or hopping operations, as described below. The virtual signature can also be used as a BRU that is transmitted for a user. Thus, the size of the virtual signature is equal to the size of the BRU, and each BRU transmission corresponds to a virtual signature. The BRUs (or virtual signatures) are first processed using a virtual signature decorrelator 210 using a predetermined or known pilot pool 205 to narrow down the pilot list. A pilot list 220 is then sent to a channel estimator 230 that estimates the channels based on the narrowed down pilot list 220 and provides a list of active virtual signatures to a decoder 240, e.g., a JMPA decoder. The decoder 240 decodes the data from the signals and the results are fed back into the virtual signature decorrelator 210 to update a priori existence probabilities for pilots and virtual signatures. Since the virtual signature space or pool is larger than the basic signature pool, the signature collisions in receiver 200 is reduced in comparison to receiver 110. Further, the virtual signature space can be increased to reach a one-to-one mapping between signature and pilot signal. In other words, the number of virtual signatures can be increased (through different combinations of basic signatures) to match the number of pilots used. Thus, the decorrelation process at the decorrelator 210 may comprise virtual signature decorrelation without pilot decorrelation. The virtual signature decorrelator 210 finds out the active virtual signature(s) and thus narrows down the list of active pilots as well as the signatures. This simplifies the pilot detection and the JMPA decoding processes in receiver 200 in comparison to receiver 100.

FIG. 3 shows BRUs 300 comprising basic signatures (or basic signature units). Each BRU 300 is generated using LDS generation. Each BRU 300 may comprise a signature corresponding to a user. The signature is repeated and arranged in a predefined manner in the BRU 300. The basic signature can be repeated in predefined rows and/or columns in the BRU 300. The size of the BRU 300 and the size of the basic signatures are predefined. For instance, a BRU 310 comprises a first basic signature 301 (Signature 1) obtained using LDS generation and repeated in rows and/or columns in the BRU 310 in a first predefined arrangement or distribution. The rows and columns represent allocated combinations of frequency bands and time intervals. For example, a row may represent a sequence of allocated frequency bands at one time interval, and a column may represent a sequence of allocated time intervals at one frequency band. A second BRU 320 comprises a second basic signature 302 (Signature 6) produced using LDS generation and repeated in rows and/or columns in the BRU 320 in a second predefined arrangement or distribution. The arrangement of columns/rows of basic signatures in a BRU 300 may be obtained using a random distribution process. Signatures 1 and 6 are different signatures, from a set of available signatures for users, which may have the same size. The signatures can be used as fixed construction blocks to produce virtual signatures, as described below.

FIG. 4 shows an embodiment of virtual signatures 400 generated by column-wise permutation. The virtual signatures 400 can be obtained by selecting columns in different BRUs 300 via a permutation process. This results in each virtual signature 400 comprising a unique arrangement or distribution of columns, each column including a stack of the same basic signature. For instance, a first virtual signature 410 comprises a first column including a stack of first basic signatures 401 (Signature 1), a second column including a stack of second basic signatures 402 (Signature 2) next to the first column, a third column including a stack of third basic signatures 403 (Signature 6), and possibly other similar or different columns (not shown). A second virtual signature 420 comprises a first column including a stack of the third basic signatures 403 (Signature 6), a second column including a stack of the first basic signatures 401 next to the first column, a third column including a stack of fourth basic signatures 404 (Signature 5), and possibly other similar or different columns (not shown). The columns are arranged differently for each different virtual signature 400, as shown in FIG. 4 for virtual signatures 410 and 420. The columns are generated using a permutation operation of columns of basic signatures selected from an available or predetermined set of basic signatures. Each column includes one corresponding basic signature. The column-wise permutation operation introduces a number of combinations of basic signatures that exceeds the number of available basic signatures (e.g., 6 basic signatures in total), thus increasing the LDS space. The resulting virtual signatures 400 have the same BRU size.

FIG. 5 shows an embodiment of virtual signatures 500 generated by row-wise permutation. The virtual signatures 500 can be obtained by selecting rows in different BRUs 300 via a permutation process. This results in each virtual signature 500 comprising a unique arrangement or distribution of rows, each row including a sequence of the same signature. For instance, a first virtual signature 510 comprises a first row including a sequence of first basic signatures 501 (Signature 1), a second row including a sequence of second basic signatures 502 (Signature 6), and possibly other similar or different rows (not shown). A second virtual signature 520 comprises a first row including a sequence of the third basic signatures 403 (Signature 6), a second row including a sequence of the first basic signatures 501 (Signature 1), and possibly other similar or different rows (not shown). The rows are arranged differently for each different virtual signature 500, as shown in FIG. 5 for virtual signatures 510 and 520. The rows are generated using a permutation operation of rows of basic signatures selected from a set of available or predefined basic signatures. Each row includes one corresponding basic signature. The row-wise permutation operation introduces a number of combinations of basic signatures that exceeds the number of available basic signatures (e.g., 6 basic signatures in total), thus increasing the LDS space. The resulting virtual signatures 500 have the same BRU size.

FIG. 6 shows an embodiment of virtual signatures 600 generated by intra-BRU signature hopping. The virtual signatures 600 can be obtained by generating a hopping pattern according to a predefined rule in different BRUs 300. The hopping pattern redistributes basic signatures across rows and/or columns of the BRUs 300 within the same BRU. This results in each virtual signature 600 comprising a unique arrangement or distribution of signatures across the rows/columns of the virtual signature 600. The hopping operation can also be described as a combined row-wise and column-wise permutation operation that shuffles the basic signatures differently for each virtual signature 600. For instance, a first virtual signature 610 comprises a first row, a second different row, and possibly other similar or different rows. The first row includes a sequence of a first basic signature 601 (Signature 1), a second basic signature 602 (Signature 5) next to the first basic signature 601, a third basic signature 603 (Signature 4), and possibly other similar or different basic signatures. The second different row includes a sequence of a fourth basic signature 604 (Signature 6) repeated twice, a fifth basic signature 605 (Signature 2), and possibly other similar or different basic signatures.

A second virtual signature 620 comprises a first row, a second different row, and possibly other similar or different rows. The first row includes a sequence of the fourth basic signature 604 (Signature 6), the first basic signature 601 (Signature 1) next to the fourth basic signature 604, the third basic signature 603 (Signature 4), and possibly other similar or different basic signatures. The second different row includes a sequence of a sixth basic signature 606 (Signature 3), the second basic signature 602 (Signature 5 next to the sixth basic signature 606), the fifth basic signature 605 (Signature 5), and possibly other similar or different basic signatures. The basic signatures are arranged differently for each different virtual signature 600, as shown in FIG. 6 for virtual signatures 610 and 620. Since the arrangements are obtained according to a hopping pattern (or a combined row-wise and column-wise permutation), this operation introduces even a greater number of combinations of basic signatures in comparison to virtual signatures 400 and 500. The resulting virtual signatures 600 have the same BRU size.

In another embodiment, the number of virtual signatures can be further increased using the same number of available signatures above (e.g., using 6 basic signatures) by further extending the basic signature combining to inter-BRU hopping. This introduces another degree of freedom which is BRU allocation pattern. The BRU allocation pattern is a binary vector identifying which BRU is allocated to which user or user equipment (UE). The sequence hopping can be across multiple allocated BRUs (between different BRUs). Using this scheme, one-to-one mapping between virtual signatures and pilots can be possible due to the resulting large LDS space. Implementing inter-BRU hopping with any of the other basic signature combining operations, such as column-wise permutation, row-wise permutation, or intra-BRU hopping may depend on the scheduling resource granularity and may increase the blind detection hypotheses.

Figure 7:
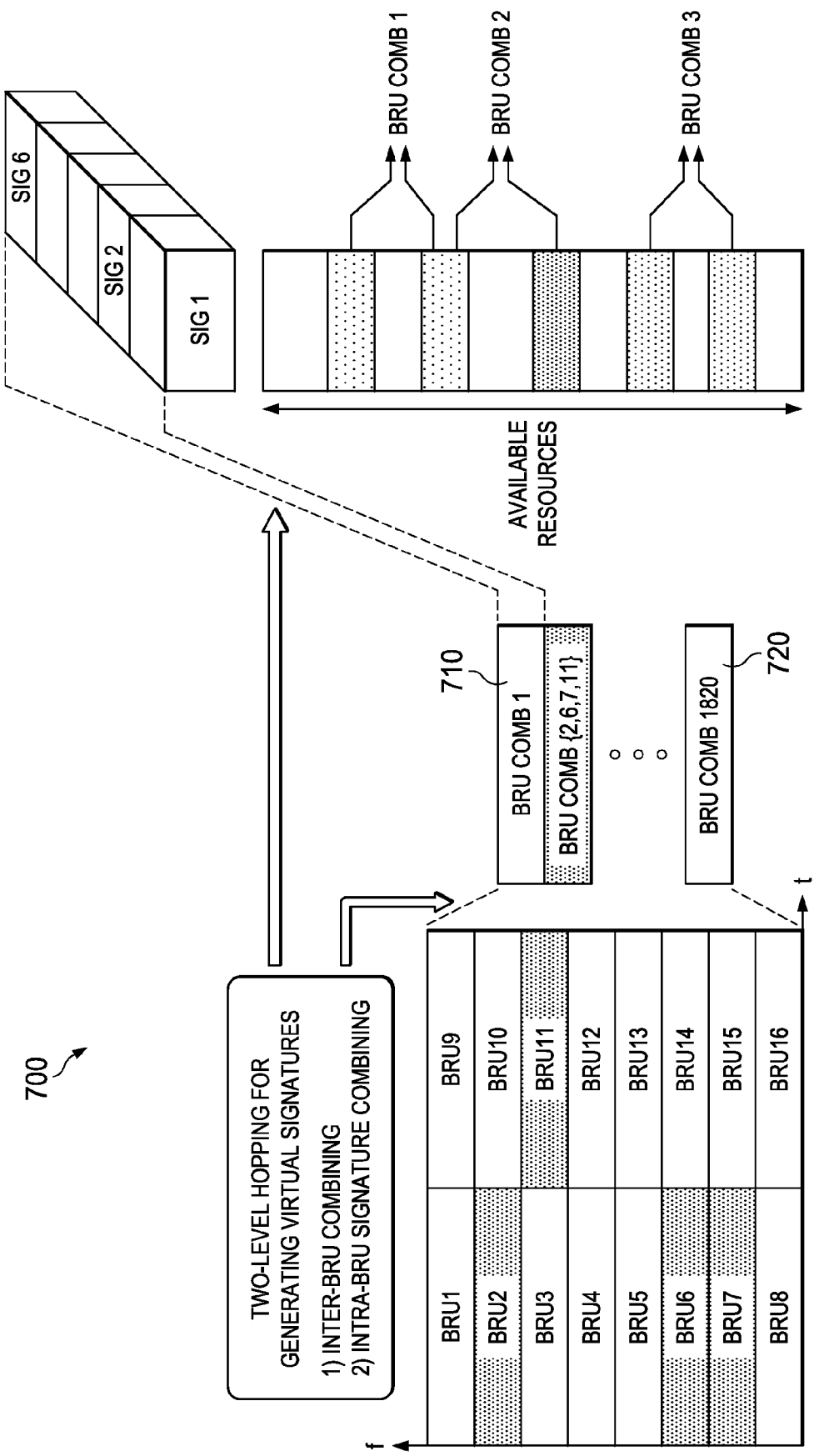
FIG. 7 illustrates an embodiment of virtual signatures generated by intra-BRU and inter-BRU signature hopping.

FIG. 7 shows an embodiment of virtual signatures 700 generated by two-level hopping, inter-BRU and intra-BRU signature hopping. The virtual signatures 700 can be obtained by intra-BRU signature combining (intra-BRU signature hopping) and inter-BRU combining (inter-BRU signature hopping). For example, each user can be allocated 4 BRUs out of 16 BRUs. In this case, there is a total of $(_4^6)$=1820 combinations for the 4 BRUs. Further, each BRU can comprise 2 basic signatures combined using sequence hopping (intra-BRU hopping). In this case, there are $6^2$=36 possible options for sequence hopping. For instance, using 16 available BRUs, each comprising 2 basic signatures with sequence hopping, a first user can be assigned a first BRU set 710 (BRU comb 1) including 4 BRUs (BRUs, 2, 6, 7, and 11). A second user can be assigned a second BRU set 720 (BRU comb 1820) also including 4 BRUs. However, the second BRU set 720 comprises a different combination of 4 BRUs.

Figure 8:
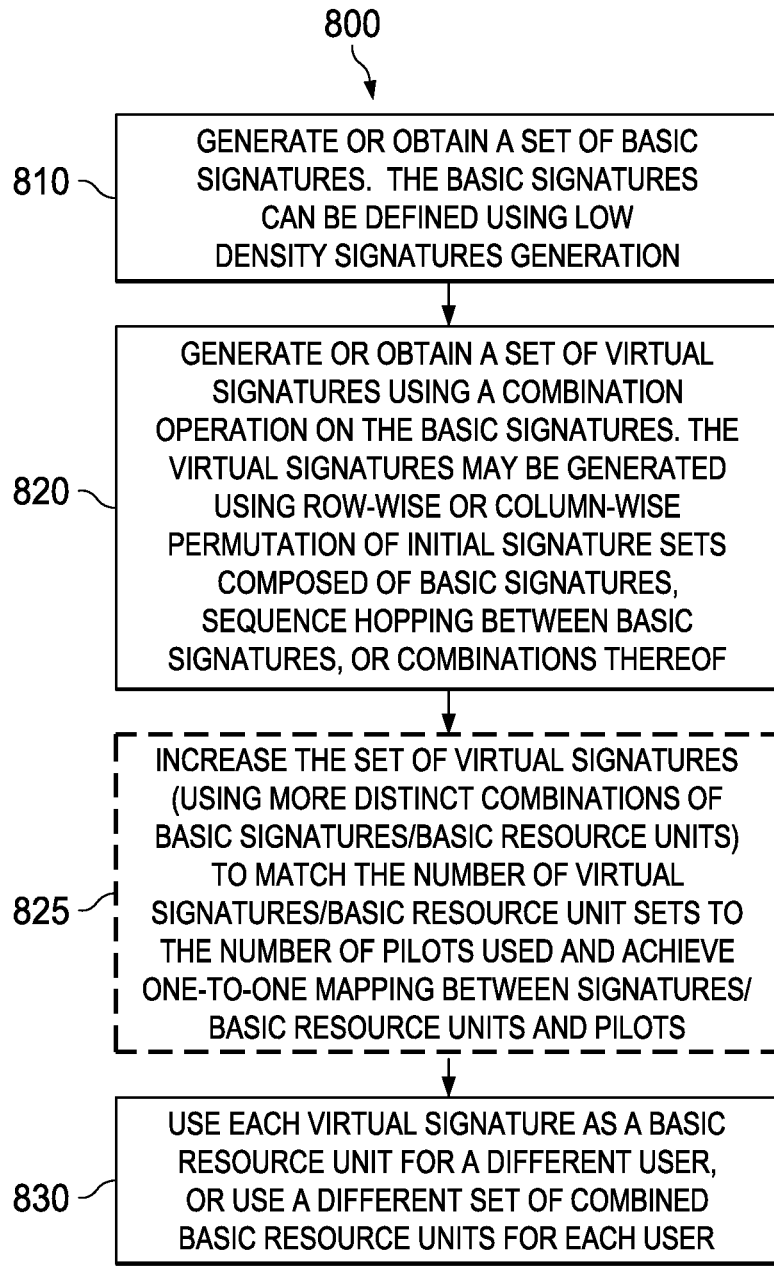
FIG. 8 is a flowchart that illustrates an embodiment method for increasing low density signature space for multiplexed transmissions for a plurality of users.

FIG. 8 shows an embodiment method for increasing low density signature space for multiplexed transmissions for a plurality of users. The method 800 can be implemented at a user node or device or by the network to define virtual signatures or BRUs for the user, e.g., using any of the schemes or operations above. At step 810, a set of basic signatures are generated or obtained. The basic signatures can be defined using LDS generation. The basic signatures are different from each other. At step 820, a set of virtual signatures is generated or obtained using a combination operation on the basic signatures. For instance, the virtual signatures are generated using row-wise or column-wise permutation within BRUs composed of basic signatures, sequence (intra/inter BRU) hopping between basic signatures, or combinations thereof. At an optional step 825, the set of virtual signatures is increased (using more distinct combinations of basic signatures/BRUs) to match the number of virtual signatures/BRU sets to the number of pilots used and achieve one-to-one mapping between signatures/BRUs and pilots. At step 830, each virtual signature is used as a BRU for a different user. Alternatively, a different set of combined BRUs is used for each user. The resulting set of virtual signatures and BRUs exceeds the set of basic signatures. The basic signatures, virtual signatures, or BRUs can be generated at the user device or obtained from the network.

Figure 9:
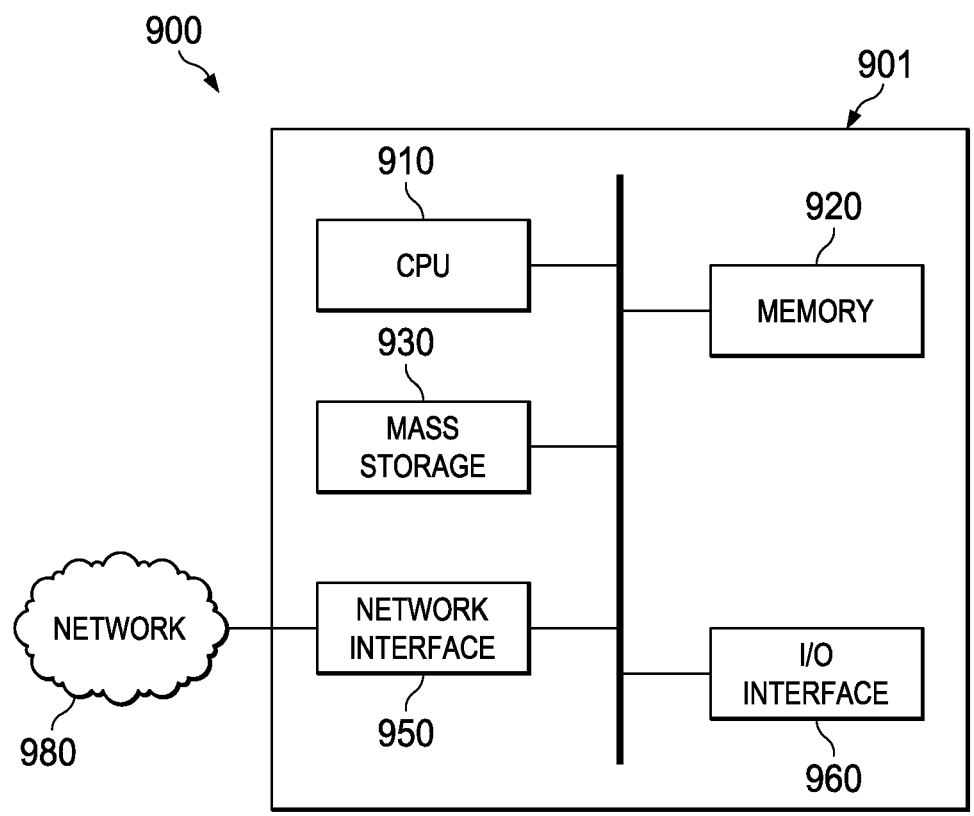
FIG. 9 is a diagram of an exemplary processing system that can be used to implement various embodiments.

FIG. 9 is a block diagram of an exemplary processing system 900 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a network interfaces, storage interfaces, and the like. The processing unit 901 may include a central processing unit (CPU) 910, a memory 920, a mass storage device 930, and an I/O interface 960 connected to a bus. The bus may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. At a network component, a method for providing increased signature space for multiplexed transmissions for a plurality of users, the method comprising:

obtaining, by the network component, a set of basic signatures;

generating, by the network component, a set of virtual signatures using an operation on the basic signatures, wherein each of the virtual signatures comprises a combination of at least some of the basic signatures, wherein the generating maps a first space of the set basic signatures into a second space of the set of virtual signatures, and wherein the second space is larger than the first space;

repeating, by the network component, the obtaining and the generating to produce a plurality of virtual signature sets, each of the plurality of virtual sets comprising a combination of virtual signatures; and provisioning, by the network component, each virtual signature set of the plurality of virtual signature sets as one of a plurality of basic resource unit (BRU) sets, each BRU set comprising a combination of BRUs, for a corresponding user transmission, from each of the plurality of users, utilizing the second larger space of the each virtual signature set.

2. The method of claim 1, wherein the obtaining of the set of basic signatures includes generating the basic signatures using a low density signature generation method.

3. The method of claim 1, wherein the operation is a row-wise permutation for combining, in each of the virtual signatures, rows of corresponding basic signatures, each of the rows includes a same basic signature selected from the set of basic signatures, and wherein the rows represent sequences of frequency bands at one time interval or sequences of allocated time intervals at one frequency band.

4. The method of claim 1, wherein the operation is a column-wise permutation for combining, in each of the virtual signatures, columns of corresponding basic signatures, each of the columns includes a same basic signature selected from the set of basic signatures, and wherein the columns represent sequences of time intervals at one frequency band or sequences of frequency bands at one time interval.

5. The method of claim 1, wherein the operation is intra-BRU hopping to add, in each of the virtual signatures, a hopping sequence of basic signatures, and wherein each of the virtual signatures includes rows, columns, or both rows and columns each including a sequence of the basic signatures.

6. The method of claim 1, wherein the plurality of BRU sets comprises a first BRU set and a second BRU set, wherein the first BRU set comprises a first combination of BRUs corresponding to a first combination of virtual signatures, and wherein the second BRU set comprises a second combination of BRUs corresponding to a second combination of virtual signatures.

7. The method of claim 6, wherein each of the plurality of BRU sets comprises a same number of BRUs, and wherein a total number of BRU sets in the plurality of BRU sets is equal to all possible combinations of BRUs in a BRU set.

8. The method of claim 1, wherein each of the virtual signatures comprises a same number of basic signatures, and wherein a total number of virtual signatures is equal to a total number of basic signatures raised to a power of the number of basic signatures in a virtual signature.

9. The method of claim 1 further comprising generating a quantity of the virtual signatures greater than a quantity of the basic signatures and greater than or equal to a quantity of pilot signals.

10. At a network component, a method supporting low density signatures for multiplexed transmissions for a plurality of users, the method comprising:
receiving, by the network component, a plurality of basic resource unit (BRU) sets for a plurality of users, each BRU set comprising a combination of BRUs, wherein each of the plurality of BRU sets comprises a plurality of virtual signatures, each virtual signature of the plurality of virtual signatures including a combination of low density signatures;
decorrelating, by the network component, the plurality of virtual signatures from the plurality of BRU sets to narrow down a list of pilot signals, wherein a total number of configured virtual signatures exceeds a total number of available low density signatures; and
estimating, by the network component, channels using the narrowed down list of pilot signals.

11. The method of claim 10 further comprising:
obtaining a set of active virtual signatures from the list of pilot signals, wherein the set of active virtual signatures is a subset of the virtual signatures;
processing the estimated channels using the set of active virtual signatures; decoding data of the users according to the processed estimated channels; and
providing updated a priori probabilities for the virtual signatures and the pilot signals according to the processed estimated channels.

12. The method of claim 10 further comprising mapping the virtual signatures in a one-to-one mapping to a complete pool of available pilot signals, wherein decorrelating the virtual signatures to narrow down the list of the pilot signals includes removing a pilot signal mapped to an inactive virtual signature from the list of pilot signals upon detecting the inactive virtual signature.

13. The method of claim 10, wherein the virtual signatures comprise a first virtual signature and a second virtual signature, wherein the first virtual signature comprises a first combination of basic signatures, and wherein the second virtual signature comprises a second combination of basic signatures.

14. A network component for supporting increased signature space for multiplexed transmissions for a plurality of users, the network component comprising:
a processor; and
a non-transitory computer readable storage medium storing programming for execution by the processor, the programming including instructions to:
receive a plurality of basic resource unit (BRU) sets for the plurality of users, each BRU set comprising a combination of BRUs, wherein each of the plurality of BRU sets comprises a plurality of virtual signatures, each virtual signature of the plurality of virtual signatures including a combination of basic signatures;
decorrelate the plurality of virtual signatures from the plurality of BRU sets to narrow a list of pilot signals, wherein a total quantity of configured virtual signatures exceeds a total quantity of available basic signatures; and
estimate channels using the narrowed down list of pilot signals.

15. The network component of claim 14, wherein the non-transitory computer readable medium is further embedded with instructions executed by the processor to:
obtain a set of active virtual signatures from the list of pilot signals, wherein the set of active virtual signatures is a subset of the virtual signatures;
process the estimated channels using the set of active virtual signatures; decode data of the users according to the processed and estimated channels; and
provide updated a priori probabilities for the virtual signatures and the pilot signals according to the processed and estimated channels.

16. The network component of claim 14, wherein the non-transitory computer readable medium embedded with instructions executed by the processor to receive the plurality of BRU s further includes receive the basic signatures, the basic signatures being generated using a low density signature generation method.

17. The network component of claim 14, wherein the non-transitory computer readable medium is further embedded with instructions executed by the processor to:
map the virtual signatures in a one-to-one mapping to a pool of available pilot signals, wherein the non-transitory computer readable medium embedded with instructions executed by the processor to decorrelate the virtual signatures to narrow the list of pilot signals further includes remove a pilot signal mapped to an inactive virtual signature from the list of pilot signals upon detecting the inactive virtual signature.

18. The network component of claim 14, wherein the plurality of BRU sets comprises a first BRU set and a second BRU set, wherein the first BRU set comprises a first combination of BRUs corresponding to a first combination of virtual signatures, and wherein the second BRU set comprises a second combination of BRUs corresponding to a second combination of virtual signatures.

19. The network component of claim 14, wherein each of the virtual signatures comprises a same number of basic signatures, and wherein a total number of virtual signatures is equal to a total number of basic signatures raised to a power of the number of basic signatures in a virtual signature.

20. The method of claim 1, wherein generating the set of virtual signatures using the operation on the basic signatures comprises generating the set of virtual signatures using a combination operation on the basic signatures.

* * * * *